J. T. NOLAN.
BOTTLE HOLDER.
APPLICATION FILED MAY 24, 1910.
984,962.
Patented Feb. 21, 1911.
2 SHEETS—SHEET 1.
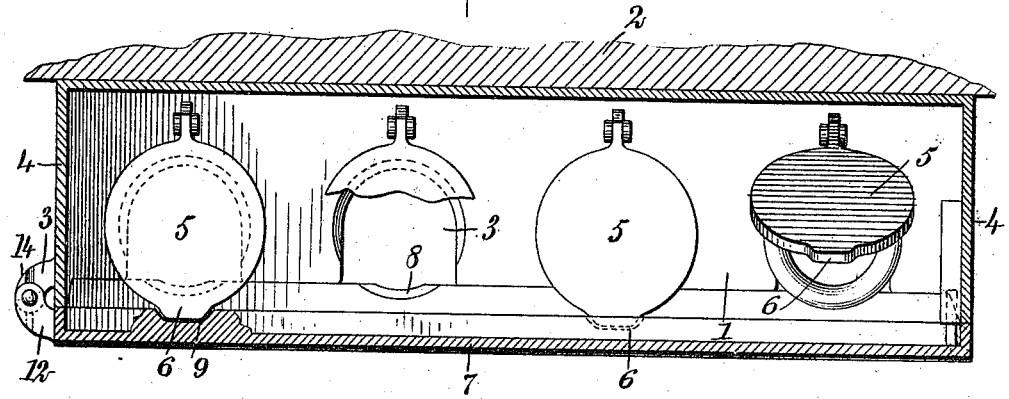
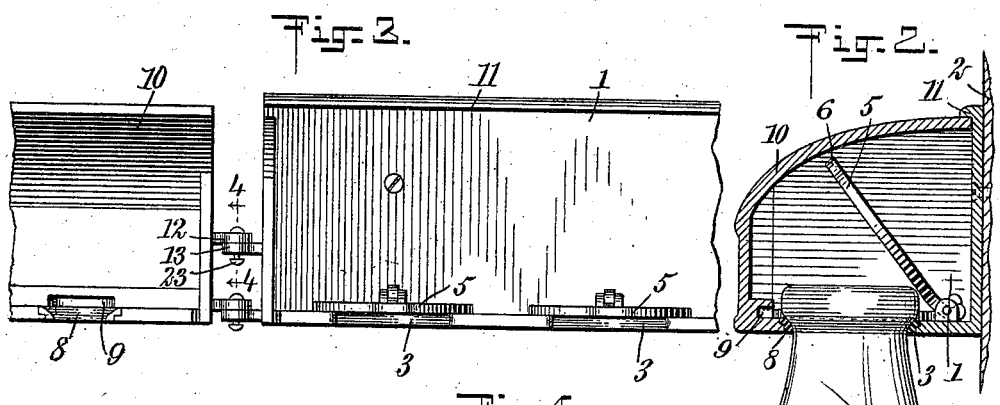
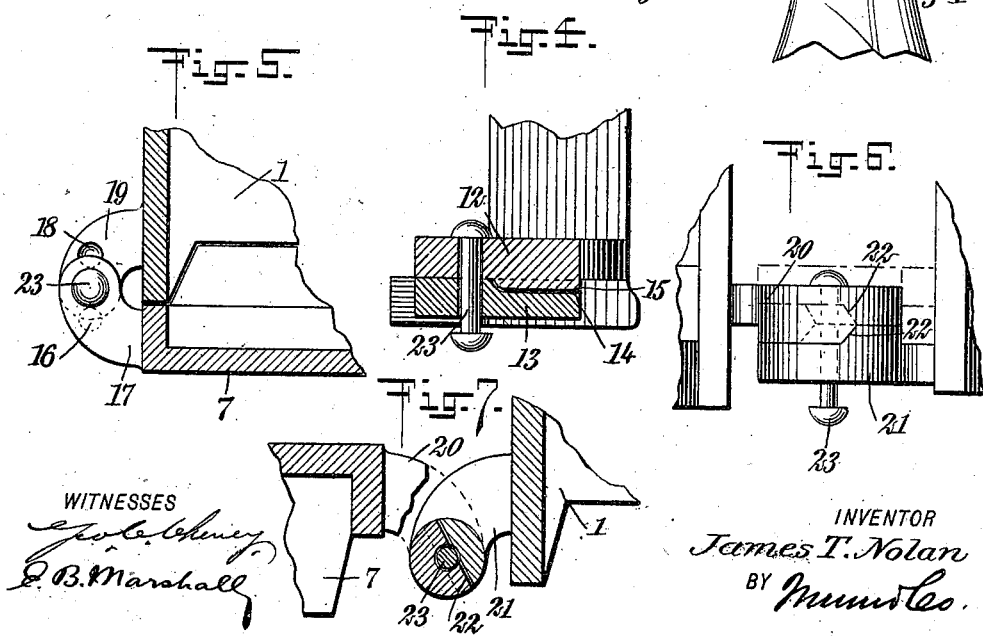
WITNESSES
INVENTOR
James T. Nolan
BY
ATTORNEYS

J. T. NOLAN.
BOTTLE HOLDER.
APPLICATION FILED MAY 24, 1910.

984,962.

Patented Feb. 21, 1911.
2 SHEETS—SHEET 2.

WITNESSES:
George Bambay.
E. B. Marshall

INVENTOR
James T. Nolan
BY
ATTORNEYS

UNITED STATES PATENT OFFICE.

JAMES THOMAS NOLAN, OF CLEVELAND, OHIO.

BOTTLE-HOLDER.

984,962. Specification of Letters Patent. Patented Feb. 21, 1911.

Application filed May 24, 1910. Serial No. 563,069.

*To all whom it may concern:*

Be it known that I, JAMES T. NOLAN, a citizen of the United States, and a resident of Cleveland, in the county of Cuyahoga and State of Ohio, have invented a new and Improved Bottle-Holder, of which the following is a full, clear, and exact description.

My invention relates to bottle holders, and has for its object to provide a milk bottle holder which can be attached to a house or stoop, and in which the milkman can hang milk bottles by their necks and by closing the door lock them to the holder.

Another object is to provide a milk bottle holder which will be clean and sanitary, said holder having holes in which the milk bottle may be held and lids or covers which are adapted to close the said holes which are not filled with bottles, the closing of the door locking the said lids which cover holes otherwise exposed.

Another object of my invention is to provide means to secure the door of the milk bottle holder when it is open, so that it will be held open until the milkman closes it.

Still further objects will appear in the full description of the invention which follows.

In this specification I will describe the approved form of my invention, but I do not limit myself thereto as I consider myself entitled to all forms and embodiments of the invention which may fall within the scope of the appended claims.

Reference is to be had to the accompanying drawings forming a part of this specification, in which similar characters of reference indicate corresponding parts in all the figures, in which—

Figure 8:
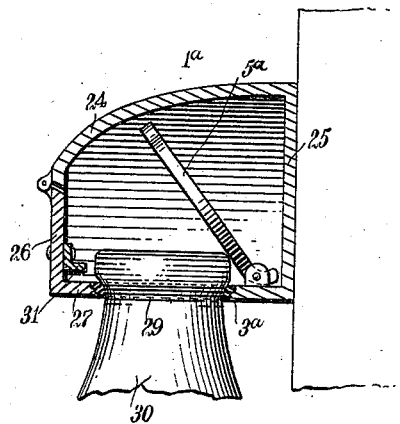
Figure 9:
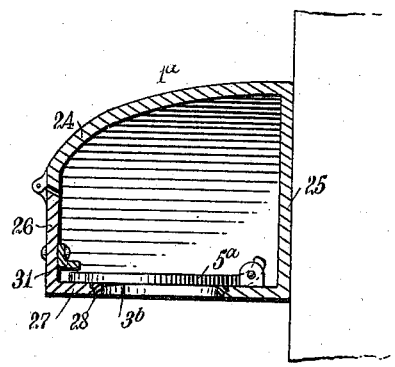
Figure 10:
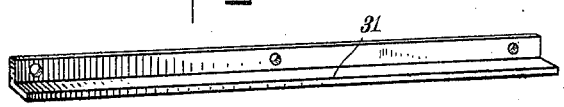
Figure 11:
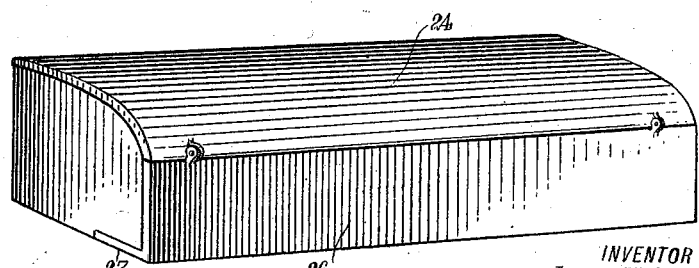

Figure 1 is a sectional plan view of the milk bottle holder; Fig. 2 is a cross sectional view of the milk bottle holder; Fig. 3 is a fragmentary elevation of the holder, the door being open; Fig. 4 is a sectional view of one form of the hinge, on the line 4—4 of Fig. 3; Fig. 5 is a view of a modified form of the hinge; Fig. 6 is a side elevation of another modified form of the hinge; Fig. 7 is a sectional plan view of the construction shown in Fig. 6; Fig. 8 is a transverse sectional view of a modified form of my invention showing the raised lid when a milk bottle has been inserted in the orifice in the openings in the bottom; Fig. 9 is a view similar to that shown in Fig. 8 but without the milk bottle and with the lid secured by the flange on the door; Fig. 10 is a perspective view showing the flange which is secured to the door to hold the lids down when milk bottles are not disposed in openings in the bottom of the box; and Fig. 11 is a perspective view showing the modified form of the invention, the details of which are shown in the Figs. 8, 9 and 10.

The box 1 is preferably oblong in character and is secured to a wall or any support 2. The box 1 has a plurality of holes 3 in its bottom at even distances apart, and these holes extend to the front of the bottom of the box, which does not extend as far forward as the side walls 4 of the box. In other words, the bottom of the box is cut in from the forward ends of the side walls 4. The holes 3 are circular except in front, to receive the neck of the milk bottle. At the rear of each hole 3, is pivoted a lid 5, which has a tongue 6 at its forward end and these lids are adapted to close the said holes.

At the front of the box there is a door 7, which is hinged at one end and this door has a horizontal member which registers with the bottom of the box and forms a continuation thereof. In this door 7, arcs 8 are cut, which when the door is closed forms a continuation of the annular portion of the holes 3. At the front of these arcs 8 are grooves 9, in which the tongues 6 of the lids 5 enter when the lids 5 are closed and the door 7 is shut. The door has a curved projecting upper member 10, which acts as a cover and seals the box from above. This projecting member fits under a flange 11, at the upper end of the rear of the box. By this means it is possible to prevent any dust or other foreign matter from entering the box through any holes in which milk bottles have not been inserted by the milkman. The holes in which bottles have been inserted are closed by the bottles, and the box is therefore sealed in every respect.

The door is retained open by a hinge of particular construction, until the milkman sees fit to close it and by doing so locks the bottles in the box. I have shown in the drawings several forms of hinges by which my object may be accomplished, but the preferred type is that shown in Figs. 1, 3 and 4. This hinge has two leaves 12 and 13. In the lower leaf 13 there is a groove 14, and a tongue 15 projects downwardly from the upper leaf 12 and is forced into the said groove 14 when the door is wide open. The said tongue in the said groove holds the door open until pressure and lifting power is used to close the door and it is locked by any provided means. In Fig. 5 I have shown a modified form of hinge, there being a pin 16 in the upper leaf 17, and a recess 18 in the lower leaf 19. The pin 16 drops into the recess 18 when the door is wide open, and the two leaves of the hinge are then brought closely together, the said pin in the said recess retaining the door open until the door is lifted and closed. In Figs. 6 and 7, I show another modified form, in which each of the leaves 20 and 21 has an offset 22, and the knuckles of the hinge lock when the door is wide open and the leaves are forced slightly apart when the door is closed. In these several constructions the pintle 23 is long enough to permit this action of the leaves to and from each other.

The annular holes in the bottom of the box and the arcs in the bottom of the door, may be covered with felt or other material to safely secure the bottles and prevent dust entering the box between the bottles and rim of the said holes. The edges of these annular openings and the arcs in the door are preferably curved to assist in making the bottles fit snugly.

With reference to the modified form of my invention shown in Figs. 8, 9, 10 and 11, it will be seen that the box 1ª has openings 3ª in its bottom, which openings extend through the forward end 3ᵇ of the said bottom, lids 5ª being pivoted to the bottom of the box at the rear of these openings 3ª. The box has a forwardly-projecting, downwardly-curved member 24, preferably integral with the rear wall 25 of the box, the door 26 being hinged to the forward end of this curved member 24 on a horizontal axis. The door 26 has an inwardly-disposed bottom member 27, having recesses 28 which unite with the openings 3ª to make circular openings adapted to engage the neck 29 of the bottle 30. A flange 31 is secured to the door 26, the flange being adapted to engage the forward ends of the lids 5ª, so that the lids may be held down when the bottles 30 have not been inserted in the openings 3ª.

Having thus described my invention, I claim as new and desire to secure by Letters Patent:

1. A milk bottle holder, consisting of a box having openings in the bottom thereof, which are adapted to receive and hold bottles by their necks, the said openings extending out to the front of the bottom of the box, lids pivoted to the box, said lids being adapted to cover said holes in which milk bottles are not disposed, a door which is hinged to the box, the said door being adapted to be moved relatively to the lids and having an approximately horizontal bottom which is adapted to come in close proximity to the front of the bottom of the box when the door is closed, and means for holding the lids against the bottom of the box.

2. A milk bottle holder, consisting of a box having openings in the bottom thereof, which are adapted to receive and hold bottles by their necks, said openings extending out to the front of the bottom of the box, lids secured to the box, the said lids being adapted to cover the openings in the box, and a door which is hinged to the box, said door having an approximately horizontal bottom which is adapted to come in close proximity to the front of the bottom of the box when the door is closed, there being grooves in the said door, adapted to register with the said lids hinged to the box, the said lids entering the said grooves when the door is closed.

3. A milk bottle holder consisting of a box having openings in its bottom, which are adapted to receive and hold bottles by their necks, the said openings extending out through the front of the bottom of the box, a door hinged on a horizontal axis, the door having a bottom which is normally disposed against the bottom of the box, a lid hinged to the box adapted to close the opening in its bottom, and a flange on the door for engaging the lid.

In testimony whereof I have signed my name to this specification in the presence of two subscribing witnesses.

JAMES THOMAS NOLAN.

Witnesses:
 EDWARD J. KEMPF,
 VICTOR E. MUELLER.